(12) United States Patent
Lee et al.

(10) Patent No.: US 10,770,727 B2
(45) Date of Patent: Sep. 8, 2020

(54) CATHODE ACTIVE MATERIAL FOR LITHIUM-SULFUR BATTERY, COMPRISING METAL SULFIDE NANOPARTICLES, AND METHOD FOR PRODUCING SAME

(71) Applicant: LG CHEM, LTD., Seoul (KR)

(72) Inventors: Dongwook Lee, Daejeon (KR); Jongwook Jung, Daejeon (KR); Kwonnam Sohn, Daejeon (KR); Doo Kyung Yang, Daejeon (KR); Gyo Hyun Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 16/308,316

(22) PCT Filed: Nov. 28, 2017

(86) PCT No.: PCT/KR2017/013676
§ 371 (c)(1),
(2) Date: Dec. 7, 2018

(87) PCT Pub. No.: WO2018/097695
PCT Pub. Date: May 31, 2018

(65) Prior Publication Data
US 2019/0267625 A1    Aug. 29, 2019

(30) Foreign Application Priority Data

Nov. 28, 2016 (KR) .................. 10-2016-0159418
Nov. 28, 2017 (KR) .................. 10-2017-0159901

(51) Int. Cl.
*H01M 4/00* (2006.01)
*H01M 4/58* (2010.01)
(Continued)

(52) U.S. Cl.
CPC .......... *H01M 4/5815* (2013.01); *C01B 17/22* (2013.01); *C01B 17/42* (2013.01); *C01B 32/70* (2017.08);
(Continued)

(58) Field of Classification Search
CPC ......... H01M 4/38; H01M 4/362; C01B 32/70; C01B 17/42
See application file for complete search history.

(56) References Cited

U.S. PATENT DOCUMENTS 6,210,831 B1    4/2001   Gorkovenko et al.
2002/0045102 A1   4/2002   Jung et al.
(Continued)

FOREIGN PATENT DOCUMENTS

CN    105226259 A    1/2016
JP    2004-179160 A   6/2004
(Continued)

OTHER PUBLICATIONS

Extended European Search Report for European Application No. 17874276.3, dated Apr. 16, 2019.
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

A positive electrode active material for a lithium-sulfur battery, and more particularly, to a positive electrode active material for a lithium-sulfur battery including metal sulfide nanoparticles and a preparation method thereof. The metal sulfide nanoparticles with large specific surface area applied to the positive electrode active material for the lithium-sulfur battery according to the present invention acts as a redox mediator during charging and discharging of the
(Continued)

lithium-sulfur battery, thereby reducing the shuttle response by not only inhibiting the formation itself of polysulfides with elution properties, but also, even if polysulfides are eluted, adsorbing them and thus preventing them from diffusing into the electrolyte solution, and thus the capacity and life characteristics of the lithium-sulfur battery can be improved.

16 Claims, 5 Drawing Sheets

(51) Int. Cl.

| | | |
|---|---|---|
| C01B 32/70 | (2017.01) | |
| H01M 4/131 | (2010.01) | |
| H01M 10/052 | (2010.01) | |
| H01M 4/583 | (2010.01) | |
| H01M 4/36 | (2006.01) | |
| C01B 17/22 | (2006.01) | |
| C01B 17/42 | (2006.01) | |
| H01M 4/38 | (2006.01) | |
| H01M 4/02 | (2006.01) | |

(52) U.S. Cl.
CPC ........... *H01M 4/131* (2013.01); *H01M 4/362* (2013.01); *H01M 4/38* (2013.01); *H01M 4/583* (2013.01); *H01M 10/052* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 2004/0101753 A1 | 5/2004 | Hwang | |
| 2006/0039850 A1 | 2/2006 | Jun et al. | |
| 2013/0065128 A1* | 3/2013 | Li | H01M 4/621 |
| | | | 429/218.1 |
| 2014/0272564 A1* | 9/2014 | Holme | H01M 4/364 |
| | | | 429/211 |
| 2015/0372291 A1 | 12/2015 | Ryu et al. | |
| 2016/0190561 A1 | 6/2016 | Son et al. | |
| 2016/0294000 A1 | 10/2016 | He et al. | |
| 2017/0207448 A1 | 7/2017 | Fanous et al. | |
| 2017/0301962 A1 | 10/2017 | Park et al. | |

FOREIGN PATENT DOCUMENTS

| | | | |
|---|---|---|---|
| JP | 2005-239505 A | 9/2005 | |
| JP | 2012-150948 A | 8/2012 | |
| JP | 2014-112526 A | 6/2014 | |
| KR | 10-2000-0074102 A | 12/2000 | |
| KR | 10-2001-0033334 A | 4/2001 | |
| KR | 10-2002-0011563 A | 2/2002 | |
| KR | 10-2005-0101802 A | 10/2005 | |
| KR | 10-2015-0020144 A | 2/2015 | |
| KR | 10-2015-0043407 A | 4/2015 | |
| KR | 10-2016-0000235 A | 1/2016 | |
| KR | 10-2016-0037079 A | 4/2016 | |
| KR | 10-2016-0119912 A | 10/2016 | |
| WO | WO 2013/008166 A1 | 1/2013 | |
| WO | WO 2015/185740 A1 | 12/2015 | |

OTHER PUBLICATIONS

International Search Report (PCT/ISA/210) issued in PCT/KR2017/013676, dated Mar. 5, 2018.

Yuan et al., "Powering Lithium-Sulphur Battery Performance by Propelling Polysulphide Redox at Sulphiphilic Hosts," Nano Letters, 2016, 34 pages.

\* cited by examiner

[Figure 1]
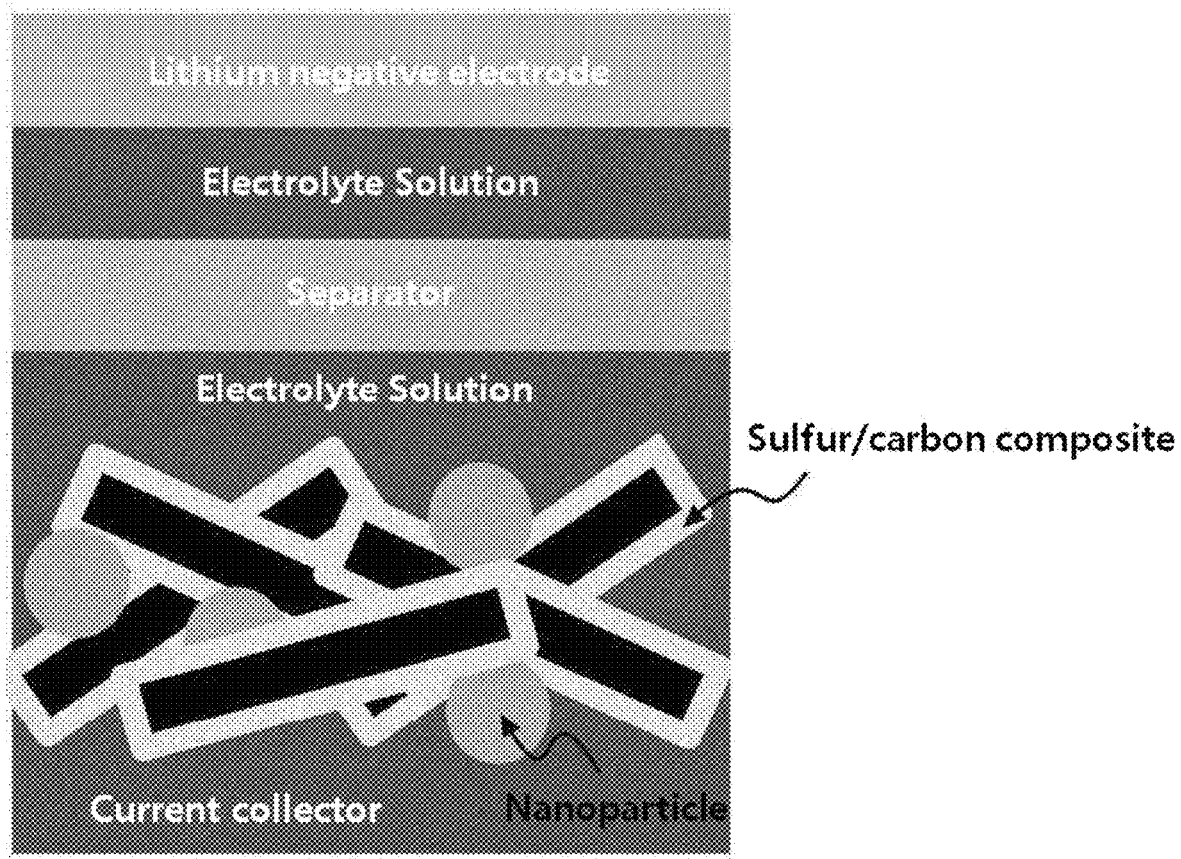
[Figure 2]
Preparation Example 1
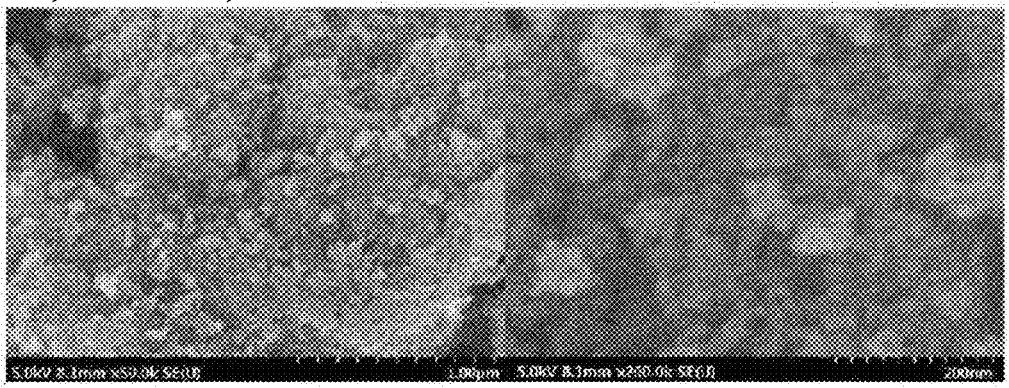

[Figure 3]
Preparation Example 2
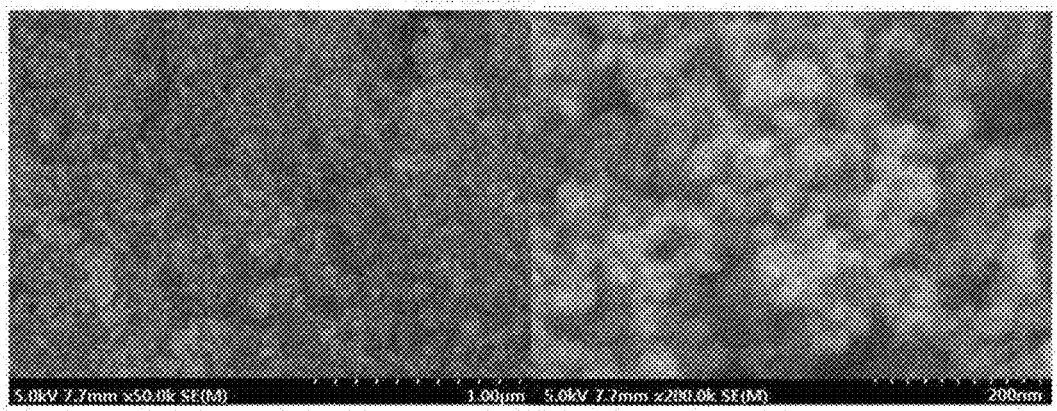
[Figure 4]
Preparation Example 3
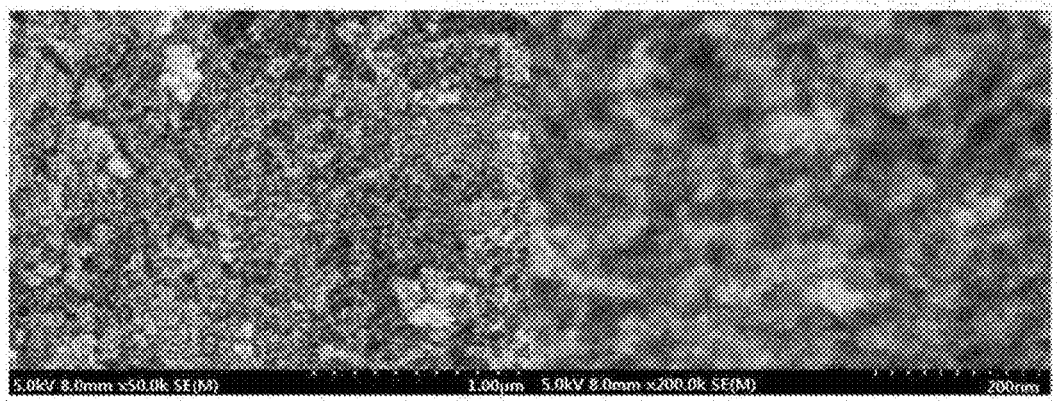

[Figure 5]
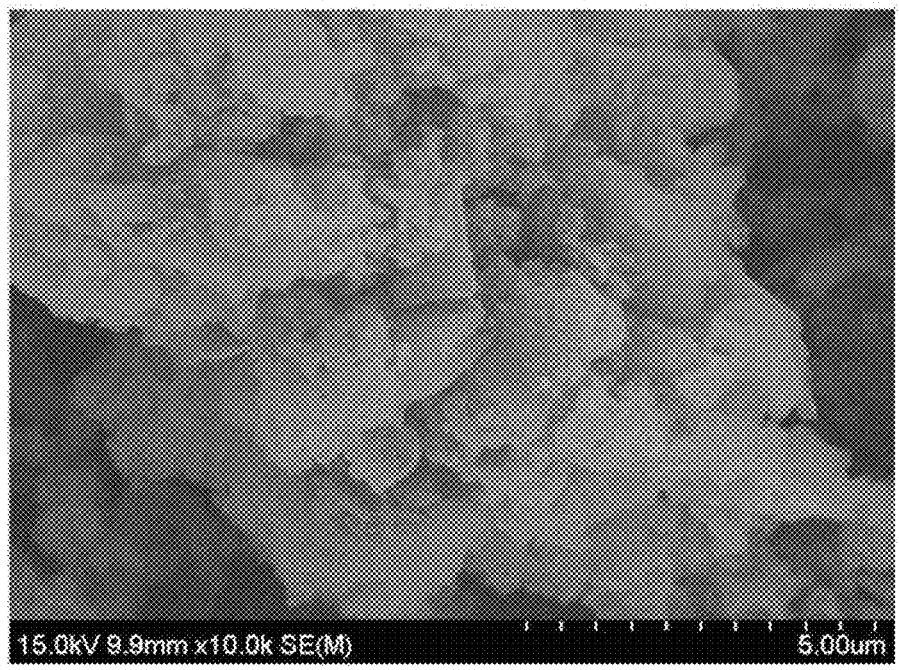

[Figure 6]
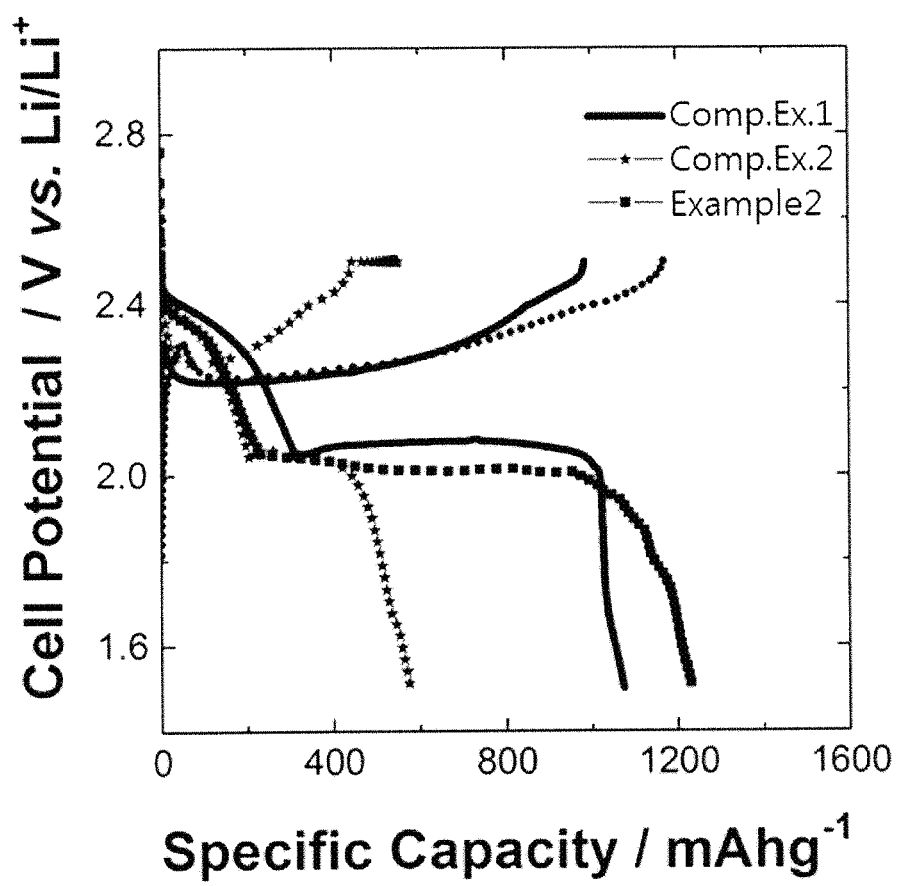

[Figure 7]
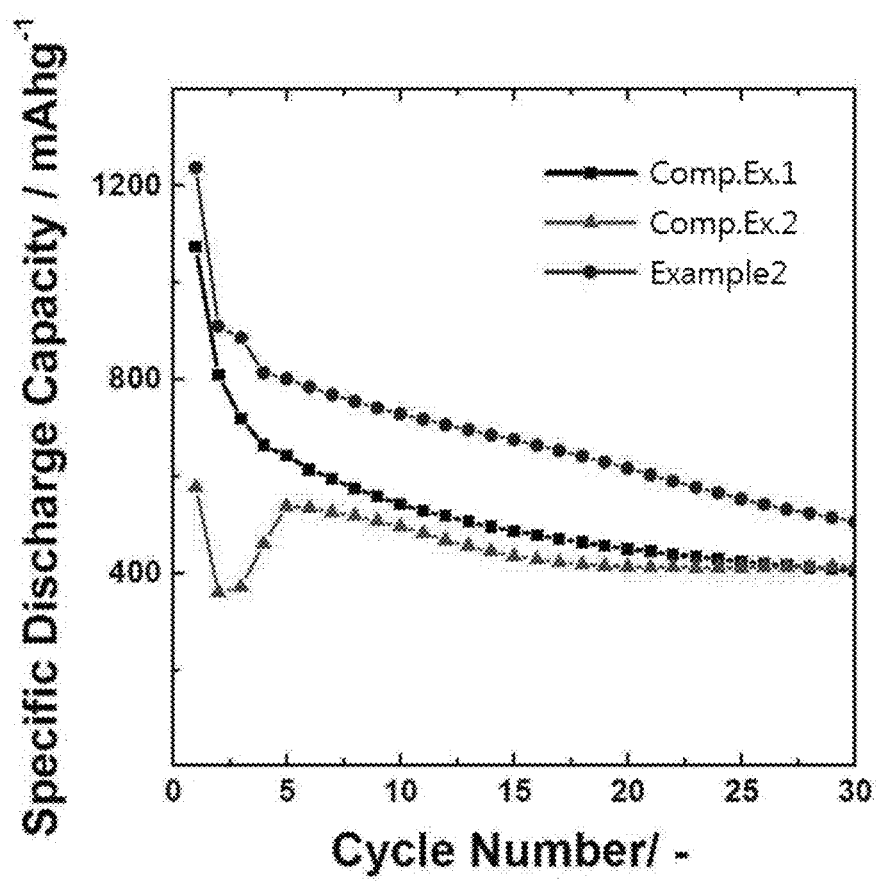

CATHODE ACTIVE MATERIAL FOR LITHIUM-SULFUR BATTERY, COMPRISING METAL SULFIDE NANOPARTICLES, AND METHOD FOR PRODUCING SAME

TECHNICAL FIELD

This application claims the benefits of priorities based on Korean Patent Application No. 10-2016-0159418, filed on Nov. 28, 2016 and Korean Patent Application No. 10-2017-0159901, filed on Nov. 28, 2017, all the contents of which are incorporated herein by reference.

The present invention relates to a positive electrode active material for a lithium-sulfur battery and a preparation method thereof, more preferably a positive electrode active material for a lithium-sulfur battery comprising metal sulfide nanoparticles and a preparation method thereof.

BACKGROUND ART

Recently, as the miniaturization and weight reduction of electronic products, electronic devices, communication devices, and the like are rapidly progressing and the need for electric vehicles has been greatly increased in relation to environmental problems, there is also a growing demand for performance improvements in secondary batteries used as power sources for these products. Among them, the lithium secondary battery has been attracting considerable attention as a high-performance battery because of its high energy density and high standard electrode potential.

The lithium-sulfur (Li—S) battery is a secondary battery using a sulfur-based material having an S—S bond (sulfur-sulfur bond) as a positive electrode active material and using lithium metal as a negative electrode active material. Sulfur, which is the main material of the positive electrode active material has advantages that it is very rich in resources, is not toxic, and has a low atomic weight. In addition, theoretical discharging capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging reaction of the lithium-sulfur battery, an oxidation reaction of lithium occurs at the negative electrode (Abode) and a reduction reaction of sulfur occurs at the positive electrode (Cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic S$_8$ structure to the linear structure of lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by exhibiting a stepwise discharge voltage unlike lithium ion battery.

Among lithium polysulfides such as Li$_2$S$_8$, Li$_2$S$_6$, Li$_2$S$_4$ and Li$_2$S$_2$, lithium polysulfide (Li$_2$S$_x$, usually x>4) which has particularly a high oxidation number of sulfur is easily dissolved in an electrolyte solution. The polysulfide (S$_8^{2-}$, S$_6^{2-}$) dissolved in the electrolyte solution diffuses far away from the positive electrode, where the lithium polysulfide is generated, by the concentration difference. Thus, the polysulfide eluted from the positive electrode is lost to the outside of the reaction zone of the positive electrode, making it impossible to perform the stepwise reduction to lithium sulfide (Li$_2$S). That is, since the lithium polysulfide which is separated from the positive electrode and the negative electrode and exists in a dissolved state cannot participate in the charging and discharging reaction of the battery, the amount of sulfur material involved in the electrochemical reaction at the positive electrode is reduced and as a result, the lithium polysulfide is a major factor in reducing the charging capacity and energy of the lithium-sulfur battery.

Furthermore, in addition to being floated or deposited in the electrolyte solution, the polysulfide diffused into the negative electrode reacts directly with lithium and sticks to the surface of the negative electrode in the form of Li$_2$S, thus causing the problem of corrosion of the lithium negative electrode.

In order to minimize the elution and diffusion of polysulfide, studies are underway to modify the morphology of the positive electrode composites which are composites formed by supporting sulfur particles on various carbon structures or metal oxides.

PRIOR ART LITERATURE (Patent Literature 1) Korean Patent Registration No. 10-0358809, FAST KINETICS LITHIUM-SULFUR BATTERIES;

(Non-Patent Literature 1) Nano Lett., 2016, 16 (1), pp 519-527 "Powering Lithium-Sulfur Battery Performance by Propelling Polysulfide Redox at Sulfiphilic Hosts."

DISCLOSURE

Technical Problem

As described above, in the case of the lithium-sulfur battery, there is a problem that as the charging/discharging cycles progress, the capacity and life characteristics of the battery deteriorate due to the polysulfide being eluted and diffused from the positive electrode. Accordingly, the present inventors have sought to develop a composite, which exhibits the inhibition property of elution of the polysulfide and adsorption property therefor, as a positive electrode active material for lithium-sulfur battery, Therefore, it is an object of the present invention to provide a lithium-sulfur battery in which the elution and diffusion of lithium polysulfide is suppressed.

Technical Solution

In order to achieve the above object, the present invention provides sulfur/carbon composite; and a positive sulfide active material for the lithium-sulfur battery comprising metal sulfide nanoparticles.

In addition, the present invention provides a preparation method of the positive electrode active material for the lithium-sulfur battery, which is prepared by mixing metal sulfide nanoparticles to sulfur/carbon composite, characterized in that the preparation method of the metal sulfide nanoparticles comprises the following steps of i) preparing a sulfur precursor solution and a metal precursor solution; ii) mixing the sulfur precursor solution and the metal precursor solution; iii) reacting the mixed solution at 50 to 100° C. for 5 to 24 hours; iv) washing and purifying the solution; and v) performing the drying.

Also, the present invention provides a positive electrode comprising the positive electrode active material and a lithium-sulfur battery including the same.

Advantageous Effects

The metal sulfide nanoparticles with a large specific surface area applied to the positive electrode active material for the lithium-sulfur battery according to the present invention acts as a redox mediator during charging and discharging of the lithium-sulfur battery, thereby reducing the shuttle response by not only inhibiting the formation itself of polysulfides with an elution property, but also, even if the polysulfides are eluted, adsorbing them and preventing them from diffusing into the electrolyte solution, and thus the capacity and life characteristics of the lithium-sulfur battery can be improved.

In addition, since the metal sulfide nanoparticles used in the present invention are small in size and can be dispersed in water, when the pre-dispersed aqueous dispersion is added during the preparation of the slurry, there is an advantage that the dispersibility with the active material, the conductive material, and the binder is not impaired. In this case, the metal used is relatively inexpensive as compared with expensive noble metal usually used as a catalyst, so that it is economical and the preparation process thereof is simple.

DESCRIPTION OF DRAWINGS

FIG. 1 is a schematic cross-sectional view of the lithium-sulfur battery of the present invention.

FIG. 2 is an SEM image of $CoS_2$ nanoparticles according to Preparation Example 1 of the present invention.

FIG. 3 is an SEM image of $CoS_2$ nanoparticles according to Preparation Example 2 of the present invention.

FIG. 4 is an SEM image of $CoS_2$ nanoparticles according to Preparation Example 3 of the present invention.

FIG. 5 is an SEM image of $CoS_2$ nanoparticles according to Comparative Preparation Example 1 of the present invention.

FIG. 6 is a charging/discharging curve of Example 2 and Comparative Examples 1 and 2 of the present invention.

FIG. 7 is data showing a life maintenance of Example 2 and Comparative Examples 1 and 2 of the present invention.

BEST MODE

Hereinafter, the present invention will be described in detail.

The present invention relates to a positive electrode active material for a lithium-sulfur battery comprising sulfur/carbon composite and metal sulfide nanoparticles. The metal sulfide nanoparticles may be sporadically distributed on at least a portion of the surface of sulfur/carbon composite, or may also be supported on the porous carbon and thus located on the interface between the carbon and sulfur.

Metal Sulfide Nanoparticle

The metal sulfide nanoparticles according to the present invention act as a kind of catalyst as a redox mediator. The metal sulfide nanoparticles according to the present invention can be dispersed in water due to the size of the particles. When metal sulfide nanoparticles are applied as a redox mediator, the polysulfide is adsorbed without diffusion from the carbon surface to the electrolyte solution or negative electrode. In this case, the electron transfer is facilitated by the catalytic action, and thus the reduction reaction to the non-eluting solid phase $Li_2S_2$ or $Li_2S$ is promoted and thus the kinetics of the discharging reaction (reduction reaction) of the whole sulfur is accelerated, thereby reducing the amount of polysulfide to be eluted.

The metal sulfide nanoparticle is represented by $M_xS_y$ (wherein x and y are integers that satisfy 0<x≤5 and 0<y≤5 respectively), M is at least one element selected from the group consisting of cobalt (Co), molybdenum (Mo), titanium (Ti), nickel (Ni), copper (Cu), iron (Fe), cadmium (Cd), lead (Pb), manganese (Mn), antimony (Sb), arsenic (As), silver (Ag) and mercury (Hg). Specifically, the metal sulfide may be one of $CoS_2$, $MoS_2$, $TiS_2$, $Ag_2S$, $As_2S_3$, CdS, CuS, $Cu_2S$, FeS, $FeS_2$, HgS, $MoS_2$, $Ni_3S_2$, NiS, $NiS_2$, PbS, $TiS_2$, MnS and $Sb_2S_3$. Since the metal sulfide nanoparticles have an adsorption amount and an adsorption energy of polysulfide ions per unit area larger than the carbon material used for the composite and not only exhibit an adsorption action but also exhibit a catalytic function, thereby having improved electrode reactivity, they can be preferably applied as a redox mediator.

In addition, the average particle diameter of the metal sulfide nanoparticles is 0.1 to 200 nm, preferably 10 to 100 nm, more preferably 20 to 50 nm. The smaller the average particle diameter of nanoparticles, the larger the specific surface area, and thus the adsorption ability to the eluted polysulfide is excellent. Also, if the average particle diameter is extended to the micro range, since the water dispersibility is lowered, the reactivity of the electrode is rather reduced. The above-mentioned metal sulfide nanoparticles having a particle diameter of 200 nm or less can be achieved by using a surfactant. When a surfactant is used in preparing the slurry, the nanoparticles are well mixed with a solvent, an active material, and a conductive material to form a stable slurry without sedimentation and phase separation. Particularly, when a surfactant containing an electron-rich functional group is used, the functional groups are adhered to the surface of the nanoparticles to reduce the aggregation of particles in the solvent, and dispersion is facilitated by the interaction between the hydrophilic functional groups, and thus water dispersibility is improved.

The metal sulfide nanoparticles are preferably contained in an amount of 1 to 20% by weight, preferably 5 to 10% by weight based on the total weight of the positive electrode active material. If the content is less than 1% by weight, the effect of inhibiting the formation and elution of polysulfide is insufficient. On the other hand, if the content exceeds 20% by weight, the content of sulfur/carbon composite is relatively decreased, and thus battery performance is rather deteriorated.

The metal sulfide nanoparticles of the present invention can be prepared by solution synthesis by performing the following steps.

First, i) A sulfur precursor solution and a metal precursor solution are prepared.

The type of the sulfur precursor solution is not particularly limited in the present invention, but the sulfur precursor solution is a solution prepared from the compound containing elemental sulfur. According to one embodiment of the present invention, the sulfur precursor solution may be a solution in which at least one selected from the group consisting of thioacetamide (TAA), thiourea and sodium sulfide ($Na_2S$) is dissolved in water or ethanol.

In this case, the sulfur precursor solution may contain a predetermined surfactant. In this case, the surfactant may be contained on the order of 1 to 5 mol % based on the sulfur precursor. The surfactant that can be used in the present invention is not particularly limited, but in particular, when a surfactant containing electron-rich functional groups is used, the functional groups are adhered to the surface of the particles to reduce the aggregation phenomenon of particles in the solvent, and dispersion is facilitated by the interaction between the hydrophilic functional groups, and thus water dispersibility is improved. According to one embodiment of the present invention, sodium dodecyl sulfate (SDS) is used as the surfactant.

The metal precursor solution is a solution including at least one compound selected from the group consisting of acetate, hydroxide, nitrate, nitride, sulfate, sulfide, alkoxide and halide which contains at least one selected from the group consisting of cobalt (Co), molybdenum (Mo), titanium (Ti), nickel (Ni), copper (Cu), iron (Fe), cadmium (Cd), lead (Pb), manganese (Mn), antimony (Sb), arsenic (As), silver (Ag) and mercury (Hg). The solvent for dissolving the metal precursor is not particularly limited. According to one embodiment of the present invention, a solution prepared by dissolving $Co(NO_3)_2 \cdot 6H_2O$ as cobalt precursor in water or ethanol can be used.

Next, ii) The sulfur precursor solution and the metal precursor solution are mixed. In this case, they are added slowly for even dispersion of the reactants in the solution. The method of mixing can be carried out according to a known method, and thus the description thereof is omitted.

Thereafter, iii) The mixed solution is heated to a temperature of 50 to 100° C. and reacted for 5 to 24 hours. Such a process is carried out by a method of decomposing the sulfur precursor and the metal precursor by heat and synthesizing in a high temperature solution, and such a method is desirable to uniformly control the size and shape of nanoparticles and to synthesize nanoparticles with good crystallinity in a large quantity.

iv) The solution containing the prepared metal sulfide nanoparticles is washed and purified.

According to one embodiment of the present invention, the solution is washed twice or more with water and ethanol alternately in order to remove the impurities of the synthesized metal sulfide nanoparticles, and then centrifuged to separate the precipitated metal sulfide nanoparticles.

Last, v) The metal sulfide nanoparticles are obtained by drying. In this case, the drying temperature may vary depending on the kind of the solvent used, and may be 50 to 100° C. according to one embodiment of the present invention.

Sulfur/Carbon Composite

The carbon-sulfur composite of the present invention is intended to impart conductivity to the non-conductive sulfur material, and is a combination of carbon (C)-based materials and sulfur (S) particles, and preferably has a shape in which sulfur particles are supported on a porous carbon-based material.

The carbon-based material constituting the sulfur/carbon composite according to the present invention is not limited as long as it is a conductive carbon, and may be crystalline or amorphous carbon. Preferably, the carbon-based material is a particle or structure having a size of nano-unit, which is a porous carbon powder or carbon structure having a large specific surface area and high electric conductivity. The carbon-based material may be at least one selected from the group consisting of, for example, graphite-based materials such as natural graphite, artificial graphite, expanded graphite and graphene, activated carbon-based material, carbon black-based materials such as channel black, furnace black, thermal black, contact black, lamp black and acetylene black; carbon fiber-based materials, carbon nanotubes (CNT), and carbon nanostructures such as fullerene.

The sulfur particles supported on the carbon-based material may include elemental sulfur ($S_8$), a sulfur-based compound, or a mixture thereof. Specifically, the sulfur-based compound may be $Li_2S_n(n \geq 1)$, an organic sulfur compound or a carbon-sulfur polymer (($C_2S_x)_n$:x=2.5~50, n≥2).

The sulfur/carbon composite according to the present invention is not limited in its kind but may be a composite of sulfur and carbon nanotubes (S/CNT) according to one embodiment of the present invention.

In this case, the sulfur particles and the carbon-based material may be mixed in a weight ratio of 5:5 to 8:2 to prepare sulfur/carbon composite, and various methods known in the art can be applied to the method of supporting the sulfur particles on the carbon-based material, but the present invention is not limited thereto.

Positive Electrode Composition

The sulfur/carbon composite and the metal sulfide nanoparticles may be mixed to form a positive electrode active material.

The method of preparing the positive electrode for the lithium-sulfur battery according to one embodiment of the present invention includes a step of mixing the sulfur/carbon composite and the metal sulfide nanoparticles by a ball milling method to prepare a positive electrode active material, and then applying a slurry of the positive electrode composition containing the positive electrode active material on a predetermined positive electrode current collector and then drying to prepare the positive electrode for the lithium-sulfur battery.

The positive electrode composition for the lithium-sulfur battery of the present invention may further include a conductive material, a binder, a solvent, and other materials as described below in addition to the positive electrode active material.

Specifically, a conductive material may be added to the positive electrode composition to impart additional conductivity to the prepared positive electrode active material. The conductive material plays a role in allowing electrons to move smoothly within the positive electrode, and is not particularly limited as long as it is excellent in conductivity and can provide a large surface area without causing chemical change in the battery, but preferably a carbon-based material is used.

The carbon-based material may be any one selected from the group consisting of graphite-based materials such as natural graphite, artificial graphite, expanded graphite and graphene, activated carbon-based material, carbon black-based materials such as channel black, furnace black, thermal black, contact black, lamp black and acetylene black; carbon fiber-based materials, carbon nanotubes (CNT), carbon nanostructures such as fullerene, and mixtures thereof.

In addition to the carbon-based materials, metallic fibers such as metal mesh; metallic powder such as copper (Cu), silver (Ag), nickel (Ni) and aluminum (Al); or organic conductive materials such as polyphenylene derivatives can also be used depending on the purpose. The conductive materials may be used alone or in combination.

Also, in order to provide the positive electrode active material with an adhesion to the current collector, the positive electrode composition may further include a binder. The binder should be well dissolved in the solvent, and should not only constitute the conductive network between the positive electrode active material and the conductive material, but also have a proper impregnation property into the electrolyte solution.

The binder applicable to the present invention may be any binder known in the art, and specifically may be, but is not limited to, at least one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, and silane-based binders, or mixtures or copolymers of two or more thereof.

The content of the binder resin may be, but is not limited to, 0.5-30% by weight based on the total weight of the positive electrode for the lithium-sulfur battery. If the content of the binder resin is less than 0.5% by weight, the physical properties of the positive electrode may be deteriorated and thus positive electrode active material and the conductive material can be broken away. If the content exceeds 30% by weight, the ratio of the active material and the conductive material in the positive electrode is relatively reduced, and the battery capacity can be reduced.

A solvent for preparing a positive electrode composition for a lithium-sulfur battery in a slurry state should be easy to dry and should dissolve the binder well, and most preferably, the solvent is a solvent which capable of keeping the positive electrode active material and the conductive material in a dispersed state without dissolving them. If the solvent dissolves the positive electrode active material, since the specific gravity (D=2.07) of sulfur in the slurry is high, sulfur is submerged in the slurry and thus sulfur is concentrated in the collector during the coating process and there is a tendency that problems occur in the conductive network, thereby occurring problems in the operation of the battery.

The solvent according to the present invention may be water or an organic solvent. The organic solvent may be an organic solvent including at least one selected from the group consisting of dimethylformamide, isopropyl alcohol, acetonitrile, methanol, ethanol, and tetrahydrofuran.

The positive electrode composition may be mixed by stirring by a conventional method using conventional mixers such as a paste mixer, a high-speed shear mixer, a homo-mixer, or the like.

The positive electrode composition may be applied to the current collector and dried in a vacuum to form a positive electrode for the lithium-sulfur battery. The slurry can be coated on the current collector with an appropriate thickness according to the viscosity of the slurry and the thickness of the positive electrode to be formed, and can be appropriately selected within a range of preferably 10 to 300 μm.

In this case, there is no limitation on the method of coating the slurry, and the method of coating the slurry may include, for example, a doctor blade coating, a dip coating, a gravure coating, a slit die coating, a spin coating, a comma coating, a bar coating, a reverse roll coating, a screen coating, a cap coating method and the like.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam or nonwoven fabric.

Lithium-Sulfur Battery

FIG. 1 is a schematic cross-sectional view of a lithium-sulfur battery of the present invention. As one embodiment of the present invention, the lithium-sulfur battery may include a positive electrode for the lithium-sulfur battery comprising the positive electrode composition as described above; a negative electrode comprising a lithium metal or lithium alloy as a negative electrode active material; a separator interposed between the positive electrode and the negative electrode; and electrolyte which is impregnated to the negative electrode, the positive electrode and the separator and includes a lithium salt and an organic solvent.

The negative electrode may include a material capable of reversibly intercalating or deintercalating lithium ion ($Li^+$), a material capable of reversibly forming lithium containing compounds by reacting with lithium ion, or lithium metal or lithium alloy, as the negative electrode active material. The material capable of reversibly intercalating or deintercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate or silicon. The lithium alloy may be, for example, an alloy of lithium (Li) and a metal selected from the group consisting of Na, K, Rb, Cs, Fr, Be, Mg, Ca, Sr, Ba, Ra, Al and Sn.

Also, in the process of charging/discharging lithium-sulfur battery, sulfur used as a positive electrode active material can be changed to an inactive material and then attached to the surface of the lithium negative electrode. As mentioned above, the inactive sulfur means sulfur which is no longer able to participate in the electrochemical reaction of the positive electrode through various electrochemical or chemical reaction. The inactive sulfur formed on the surface of the lithium negative electrode also has the advantage of acting as a protective layer of the lithium negative electrode. Therefore, the lithium metal and the inactive sulfur formed on the lithium metal, such as lithium sulfide, may be used as a negative electrode.

The negative electrode of the present invention may further include a pretreatment layer made of a lithium ion conductive material, and a lithium metal protective layer formed on the pretreatment layer, in addition to the negative electrode active material.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market include Celgard series (Celgard$^R$ 2400, 2300 product from Hoechest Celanese Corp.), polypropylene separator (product from Ube Industries Ltd. or product from Pall RAI), polyethylene series (Tonen or Entek), and the like.

The electrolyte separator in the form of solid may comprise less than about 20% by weight of non-aqueous organic solvent. In this case, an appropriate gelling agent may be included to reduce the fluidity of the organic solvent. Representative examples of such gelling agent may include polyethylene oxide, polyvinylidene fluoride, and polyacrylonitrile, etc.

The electrolyte impregnated to the negative electrode, the positive electrode, and the separator is composed of a lithium salt as a non-aqueous electrolyte containing a lithium salt and an electrolyte solution. Non-aqueous organic solvent, organic solid electrolyte, and inorganic solid electrolyte, etc., are used as the electrolyte solution.

The lithium salt of the present invention is a substance which can be easily dissolved in a non-aqueous organic solvent, and for example, may include at least one selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, lithium chloroborane, lithium lower aliphatic carboxylate, lithium tetraphenyl borate, lithium imide, and mixtures thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion ($Li^+$) may be reduced.

The non-aqueous organic solvent should dissolve the lithium salt well, and the non-aqueous organic solvent of the present invention may include, for example, aprotic organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N, N-substituted imidazolidine, ethylene glycol dialkyl ether, ammonium salt, pyrrole, 2-methoxy ethanol, or aluminum trichloride, etc. may also be added for the purpose of improving charge-discharge characteristics, flame retardancy, and the like. In some cases, a halogen-containing solvent such as carbon tetrachloride, ethylene trifluoride or the like can be also added for the purpose of imparting nonflammability, and a carbon dioxide gas can be further included for the purpose of improving storage characteristics at a high temperature, and FEC (fluoro-ethylene carbonate), PRS (propene sultone), FPC (fluoro-propylene carbonate) and the like can be further included.

The electrolyte may be used as a liquid electrolyte or also as an electrolyte separator form in a solid state. When used as a liquid electrolyte, a separator made of porous glass, plastic, ceramic, or polymer is further included as a physical separator having a function of physically separating the electrode.

Hereinafter, the present invention will be described in detail with reference to examples. However, the examples according to the present invention can be modified into various other forms, and the scope of the present invention should not be construed as being limited to the examples described in detail below. Examples of the present invention are provided to more fully describe the present invention to those skilled in the art.

PREPARATION EXAMPLE 1

Preparation of $CoS_2$ Nanoparticle 20 mmol of $C_2H_5NS$ (Thioacetamide: TAA) and 0.4 mmol of SDS as a reactant were dissolved in 100 ml of ethanol, and then 0.2 g of hydrazine was added. A solution prepared by dissolving 10 mmol of $Co(NO_3)_2 \cdot 6H_2O$ in 120 ml of ethanol was slowly added to the TAA mixed solution, followed by reaction at 78° C. for 15 hours. The synthesized particles were washed three times with water and ethanol, centrifuged and dried at 70° C. for 4 hours to obtain powder particles of about 50 nm.

SEM images of the obtained $CoS_2$ nanoparticles were shown in FIG. 2, and the results of EDS composition analysis were shown in Table 1 below. As a result of analyzing the composition of $CoS_2$ nanoparticles, it was found that the composition of the nanoparticles was generally uniform, and the S/Co ratio of sulfur to cobalt was from 1.67 to 1.78 which may be expressed as $CoS_{2-x}$, in which sulfur is slightly lacking.

TABLE 1

| EDS | area | point | point | point | point |
|---|---|---|---|---|---|
| S | 64.11 | 63.38 | 62.59 | 63.57 | 63.61 |
| Co | 35.89 | 36.62 | 37.41 | 36.43 | 36.39 |
| S/Co | 1.78 | 1.73 | 1.67 | 1.74 | 1.75 |

PREPARATION EXAMPLE 2

Preparation of CoS2 Nanoparticle

Powder particles of about 50 nm were obtained in the same manner as in Preparation Example 1, except that DI-water was used instead of ethanol.

SEM images of the obtained $CoS_2$ nanoparticles were shown in FIG. 3, and the results of EDS composition analysis were shown in Table 2 below. As a result of analyzing the composition of $CoS_2$ nanoparticles, it was found that similar to Preparation Example 1, the composition of the nanoparticles was generally uniform, and the S/Co ratio of sulfur to cobalt was 1.94 to 2.09 which is almost close to $CoS_2$.

TABLE 2

| EDS | area | point | point | point | point |
|---|---|---|---|---|---|
| S | 67.62 | 67.30 | 66.89 | 65.99 | 66.07 |
| Co | 32.38 | 32.70 | 33.11 | 34.01 | 33.93 |
| S/Co | 2.09 | 2.06 | 2.02 | 1.94 | 1.95 |

PREPARATION EXAMPLE 3

Preparation of CoS2 Nanoparticle

A solution of 5 mmol of $Co(NO_3)_2 \cdot 6H_2O$ as a reactant dissolved in 75 ml of DI water was slowly added to a solution of 15 mmol of $Na_2S \cdot 9H_2O$ dissolved in 75 ml of DI water, followed by reaction at room temperature for 15 hours. Thereafter, powder particles of about 50 nm were obtained in the same manner as in Preparation Example 1.

SEM images of the obtained $CoS_2$ nanoparticles were shown in FIG. 4, and the results of EDS composition analysis were shown in Table 3 below. As a result of analyzing the composition of $CoS_2$ nanoparticles, it was found that similar to Preparation Examples 1 and 2, the composition of the nanoparticles was generally uniform, and the S/Co ratio of sulfur to cobalt was 1.43 to 1.46 which may be expressed as $CoS_{2-y}$, showing that sulfur is most deficient compared to the above Preparation Examples.

TABLE 3

| EDS | area | point | point | point | point |
|---|---|---|---|---|---|
| S | 59.36 | 58.88 | 58.99 | 58.90 | 58.88 |
| Co | 40.64 | 41.12 | 41.01 | 41.10 | 41.12 |
| S/Co | 1.46 | 1.43 | 1.44 | 1.43 | 1.43 |

COMPARATIVE PREPARATION EXAMPLE 1

$CoS_2$ Microparticle 2.83 g of $CoCl_2 \cdot 6H_2O$ and 3.16 g of $Na_2S_2O_3$ were dissolved in 50 mL of distilled water, and the mixture was reacted at 140° C. for 12 hours in a pressure vessel. Thereafter, the solution was collected, filtered in vacuum and washed, and then dried at 60° C. to obtain a powder having a size of about 1 to 2 µm. An SEM image of the obtained $CoS_2$ microparticles was shown in FIG. 5.

EXAMPLE 1

Preparation of Positive Electrode Composition Containing $CoS_2$ Nanoparticle

The modified carbon powder (CNT) and sulfur powder were pulverized by ball-milling and then maintained in an oven at 155° C. for 30 minutes to prepare sulfur/carbon composite. 0.2 g of Denka black and 5 g of carboxymethylcellulose (CMC) dispersion were added, and 10% by weight of the $CoS_2$ nanoparticles prepared in Preparation Example 1 was added thereto and mixed with a zirconia ball. Thereafter, 3.6 g of sulfur/carbon composite prepared above and water were added in a certain amount and mixed again. Finally, 0.35 g of SBR was added and mixed again to prepare a slurry.

EXAMPLE 2

Preparation of Positive Electrode Composition Containing $CoS_2$ Nanoparticle

A slurry was prepared in the same manner as in Example 1, except that the $CoS_2$ nanoparticles prepared in Preparation Example 2 were used.

EXAMPLE 3

Preparation of Positive Electrode Composition Containing CoS2 Nanoparticle

A slurry was prepared in the same manner as in Example 1, except that the $CoS_2$ nanoparticles prepared in Preparation Example 3 were used.

COMPARATIVE EXAMPLE 1

Preparation of Positive Electrode Composition Without Addition of Nanoparticle

A slurry was prepared in the same manner as in Example 1 except that the $CoS_2$ nanoparticles were not added.

COMPARATIVE EXAMPLE 2

Preparation of Positive Electrode Composition Containing $CoS_2$ Microparticle

A slurry was prepared in the same manner as in Example 1, except that the $CoS_2$ microparticles prepared in Comparative Preparation Example 1 were used.

EXPERIMENTAL EXAMPLE 1

The slurries prepared in Examples 1 to 3 and Comparative Examples 1 and 2 were poured on an aluminum foil, coated by a blade coater to a predetermined thickness, and dried in an oven at 50° C. to prepare positive electrodes for the lithium-sulfur battery. The positive electrode was manufactured to fit the size of the coin cell and assembled in a glove box under an argon atmosphere. The positive electrode, the separator (polyethylene), the lithium negative electrode, the gasket, the coin of the stainless steel, the spring, and the top plate of the stainless steel were sequentially placed on the lower plate of the stainless steel, and the coin cell was assembled by applying pressure. A mixed solution of 1,3-dioxolane (DOL) and diethylene glycol dimethyl ether (DEGDME), in which 1 M LiFSI and 1 wt. % $LiNO_3$ are dissolved, was injected as an electrolyte solution onto the manufactured positive electrode.

The discharging and charging tests were carried out at 0.1 C rate for 2.5 cycles of the initial discharging-charging-discharging-charging-discharging, and then at 0.2 C/0.2 C charging/discharging rate. The initial discharging capacity and the discharging capacity at 30 cycles were shown in Table 4 below.

Result

TABLE 4

|  | Example 1 | Example 2 | Example 3 | Comparative Example 1 | Comparative Example 2 |
|---|---|---|---|---|---|
| Initial discharging capacity (mAh/g) | 1213 | 1237 | 1133 | 1073 | 605 |
| Discharging capacity (@30$^{th}$ cycle, mAh/g) | 538 | 576 | 518 | 404 | 414 |

As can be seen from the above Table 4, the non-addition example of Comparative Example 1 or the addition example of the microparticles of Comparative Example 2 showed the results of both lower initial discharging capacities and lower discharging capacities at 30 cycles as compared to the nanoparticle addition examples of Examples 1 to 3. Also, it can be seen that the above effects in Examples 1 to 3 are excellent in the order of Example 2>Example 1>Example 3 which is in the order of high sulfur content.

FIG. 6 is a charging/discharging curve of the lithium-sulfur battery, and FIG. 7 is data showing life maintenance. As can be seen from FIG. 6, it was found that in the case of the lithium-sulfur battery of Example 2, since there is an effect that the first stabilization zone (1st plateau: S8→S4, the zone where soluble polysulfide is eluted) is shortened and the second stabilization zone (the second plateau: S4→S2, S1, the zone where insoluble Li$_2$S is formed) is prolonged, the reactivity of the positive electrode is improved. Also, as can be seen from FIG. 7, it can be seen that the life maintenance is high and the discharging capacity is higher than Comparative Examples even after long-term cycle evaluation.

Meanwhile, it can be seen that the non-addition example of Comparative Example 1 or the addition example of the microparticles of Comparative Example 2 does not show the effect of improving the reactivity of the electrode.

The invention claimed is:

1. A positive electrode active material for a lithium-sulfur battery, which comprises:
   a sulfur/carbon composite; and
   metal sulfide nanoparticles,
   wherein the sulfur/carbon composite comprises sulfur particles supported on a porous carbon-based material, and
   further wherein the metal sulfide nanoparticles are compounds represented by M$_x$S$_y$, wherein
   x and y are integers that satisfy 0<x≤5 and 0<y≤5 respectively, and
   M is at least one metal selected from the group consisting of cobalt (Co), molybdenum (Mo), titanium (Ti), nickel (Ni), copper (Cu), iron (Fe), cadmium (Cd), lead (Pb), manganese (Mn), antimony (Sb), arsenic (As), silver (Ag) and mercury (Hg).

2. The positive electrode active material for the lithium-sulfur battery according to claim 1, wherein an average particle diameter of the metal sulfide nanoparticles is 0.1 to 200 nm.

3. The positive electrode active material for the lithium-sulfur battery according to claim 1, wherein the metal sulfide nanoparticles are included in an amount of 1 to 20% by weight based on the total weight of the positive electrode active material.

4. A preparation method of the positive electrode active material for the lithium-sulfur battery according to claim 1, which is prepared by
   mixing the metal sulfide nanoparticles with the sulfur/carbon composite, wherein the preparation method of the metal sulfide nanoparticles comprises the following steps of:
   i) preparing a sulfur precursor solution and a metal precursor solution;
   ii) mixing the sulfur precursor solution and the metal precursor solution;
   iii) reacting the mixed solution of ii) at 50 to 100° C. for 5 to 24 hours;
   iv) washing and purifying the solution resulting from iii); and
   v) drying.

5. The preparation method of the positive electrode active material for the lithium-sulfur battery according to claim 4, wherein the sulfur precursor solution is a solution in which at least one compound selected from the group consisting of thioacetamide (TAA), thiourea, and sodium sulfide (Na$_2$S) is dissolved in a solvent.

6. The preparation method of the positive electrode active material for the lithium-sulfur battery according to claim 4, wherein the sulfur precursor solution contains a surfactant.

7. The preparation method of the positive electrode active material for the lithium-sulfur battery according to claim 4, wherein the metal precursor solution is a solution including at least one compound selected from the group consisting of acetate, hydroxide, nitrate, nitride, sulfate, sulfide, alkoxide and halide, and which metal precursor solution contains at least one selected from the group consisting of cobalt (Co), molybdenum (Mo), titanium (Ti), nickel (Ni), copper (Cu), iron (Fe), cadmium (Cd), lead (Pb), manganese (Mn), antimony (Sb), arsenic (As), silver (Ag) and mercury (Hg).

8. A lithium-sulfur battery, comprising:
   a positive electrode;
   a negative electrode; and
   electrolyte,
   wherein the positive electrode comprises the positive electrode active material according to claim 1.

9. The positive electrode active material for the lithium-sulfur battery according to claim 1, wherein the metal sulfide nanoparticles are supported on the porous carbon-based material such that the metal sulfide nanoparticles are located on an interface between the porous carbon-based material and the sulfur particles.

10. The positive electrode active material for the lithium-sulfur battery according to claim 1, wherein an average particle diameter of the metal sulfide nanoparticles is 10 to 100 nm.

11. The positive electrode active material for the lithium-sulfur battery according to claim 1, wherein an average particle diameter of the metal sulfide nanoparticles is 20 to 50 nm.

12. The positive electrode active material for the lithium-sulfur battery according to claim 1, wherein the metal sulfide nanoparticles are present in an amount of 5 to 10% by weight based on a total weight of the positive electrode active material.

13. The positive electrode active material for the lithium-sulfur battery according to claim 1, wherein M is cobalt (Co).

14. The positive electrode active material for the lithium-sulfur battery according to claim 13, wherein the metal sulfide nanoparticles comprise CoS$_2$.

15. The positive electrode active material for the lithium-sulfur battery according to claim 1, wherein sulfur particles and a porous carbon-based material are mixed in a weight ratio of 5:5 to 8:2 to prepare the sulfur/carbon composite.

16. The positive electrode active material for the lithium-sulfur battery according to claim 1, wherein the metal sulfide nanoparticles are distributed on at least a portion of a surface of the sulfur/carbon composite.

* * * * *